United States Patent [19]

Gilvar et al.

[11] 3,776,575
[45] Dec. 4, 1973

[54] COUPLING DEVICE
[75] Inventors: Martin Gilvar, Westboro; Robert D. Wykes, Worcester; Charles S. Mercer, Northboro, all of Mass.
[73] Assignee: Morgan Construction Company, Worcester, Mass.
[22] Filed: Mar. 29, 1972
[21] Appl. No.: 239,036

Related U.S. Application Data
[63] Continuation of Ser. No. 46,258, June 15, 1970, abandoned.

[52] U.S. Cl. .............. 285/18, 285/26, 285/137 R, 285/320, 285/364, 285/420
[51] Int. Cl. ............................................ F16l 35/00
[58] Field of Search .................. 285/18, 24, 25, 26, 285/27, 28, 29, 420, DIG. 21, 308, 310, 320, 364; 137/613, 614.03

[56] References Cited
UNITED STATES PATENTS
3,604,730  9/1971  Carroll .................................. 285/27

| | | |
|---|---|---|
| 3,475,001 | 10/1969 | Hieber .............................. 137/614 |
| 3,527,480 | 9/1970 | Larson ....................... 285/137 R X |
| 3,330,299 | 7/1967 | Slowinski et al. ................... 137/614 |

*Primary Examiner*—Dave W. Arola
*Attorney*—Chittick, Pfund, Birch, Samuels & Gauthier

[57] ABSTRACT

A coupling for connecting fluid services to a housing. The device includes a movable coupling element which is clamped against a mating coupling element attached to the housing as an integral part thereof. Housing conduits communicate with passageways in the mating coupling element, the latter being in communication with the adjacent ends of intermediate passageways in the movable coupling element when the latter is clamped in the operative position. The other ends of the intermediate passageways are connected via flexible conduit means either to remote sources of fluid under pressure or to fluid drains. Seals at the interface between the two coupling elements insure fluid-tight integrity between the communicating passageways.

7 Claims, 4 Drawing Figures

INVENTORS
MARTIN GILVAR
CHARLES S. MERCER
ROBERT D. WYKES

BY

ATTORNEYS

COUPLING DEVICE

This is a continuation of application Ser. No. 46,258 filed June 15, 1970, and now abandoned.

DESCRIPTION OF THE INVENTION

This invention relates generally to couplings, and more particularly to a coupling device for connecting fluid services to a housing.

The invention will hereinafter be described in connection with a roll housing in a rolling mill. It will be understood, however, that this association of the invention with a particular housing type is employed herein for illustrative purposes only, and is not intended nor should it be construed as a limitation upon the scope of the invention. As the description proceeds, it will become evident that the invention has broad applicability wherever fluid services are to be coupled to housings, particularly those of the movable type.

There are at present a number of known devices for coupling fluid services to roll housings in a rolling mill. Examples of such fluid services include feed and return lines for lubricants, hydraulic fluids and cooling water. These known coupling devices usually consist of normally closed collinear valve elements for each fluid service, one valve element being located on the housing and the other in a connecting line. The mating valve elements are pushed together to produce a fluid-tight joint, there being a stem or other like male element which protrudes from one element into the other. The stem serves as the actuator which opens the valve elements to allow fluid flow therethrough.

These devices suffer from a number of problems, particularly when they are employed with heavy movable housings of the type found in rolling mills. For example, in order to operate properly, the male and female components of the valve elements must be aligned collinearly. However, the nature of heavy rolling mill housings, and their guidance during traversal, makes it difficult to align and guarantee collinearity of the mating valve elements. Misalignment during engagement of the coupling devices imposes destructive stresses and loads on the valve elements and their associated male and female components.

Another problem lies in the difficulty of maintaining static seals between the mating valve elements. Repeated engagement and disengagement of male and female valve components, in a hostile generally abrasive steel mill environment, often accompanied by misalignment, causes the static seals to wear rapidly and/or to be damaged, with a resulting loss of fluid-tight integrity.

Accordingly, it is a general object of the present invention to provide an improved device for coupling fluid services to a housing which avoids the problems and disadvantages mentioned above.

A more particular object of the present invention is to provide a coupling device which is capable of achieving consistent fluid-tight integrity during repeated engagement and disengagement of mating coupling elements, without the requirement of a high degree of collinearity between cooperating valve assemblies carried by the coupling elements.

Another object of the present invention is to provide a coupling arrangement which embodies an improved and more damage and wear resistant static seal between coupling elements.

Another object of the present invention is to provide a coupling device which includes abutting coupling elements, each having communicating passageways containing normally closed valve assemblies which are opened by fluid pressure, with fluid-tight integrity between the communicating passageways of the abutting coupling elements being provided by sealing means located at the interface therebetween.

A further object of the present invention is to provide a coupling arrangement which is rugged in design and capable of dependable extended use under adverse operating conditions, without the need for frequent repair and replacement of component parts.

These and other objects and advantages of the present invention will become more apparent as the description proceeds with the aid of the accompanying drawings in which.

Figure 1:
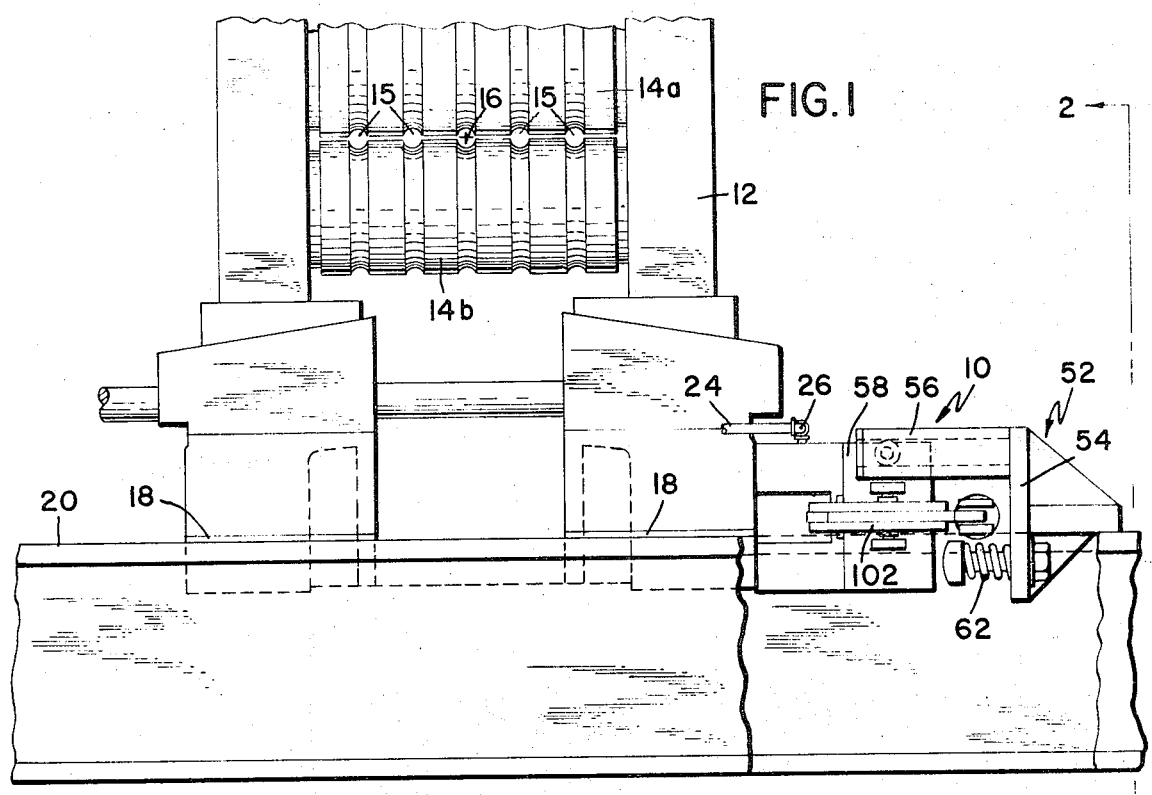
FIG. 1 is a view in side elevation of a coupling arrangement according to the present invention employed in conjunction with a typical roll housing in a rolling mill.

Referring now to the drawings, there is shown at 10 a coupling device according to the present invention employed in conjunction with a conventional roll housing 12 of the type commonly employed in rolling mills. Roll housing 12 contains a pair of work rolls 14a and 14b having grooves 15 therein which cooperate to define a plurality of roll passes. One of the roll passes is shown aligned with the mill pass line 16. The roll housing is further provided with slider pads 18 which are arranged to run along a pair of spaced parallel housing bed surfaces 20, thereby permitting sliding traversal of the roll housing in a direction transverse to the mill pass line 16.

The housing 12 may be of any known conventional design. Although not shown in detail, it will be understood that the housing carries the usual array of fluid conduits, for example tubing and piping, for conducting lubricating oil, grease, hydraulic fluid and cooling water to various housing components, in particular to the work rolls and their associated bearings and roll parting adjustment mechanisms.

The essence of the present invention, namely, the means for connecting either remote sources of fluid under pressure or drain lines to the housing conduits, will not be described.

All of the aforementioned housing conduits are connected to a coupling element 22 attached to the base of the housing as an integral part thereof. In the interest of simplicity, only one housing conduit, for example a hydraulic fluid feed line 24, has been partially shown in the drawings. However, it will be understood that in actual practice, a number of other conduits will be similarly connected.

The feed line 24 is connected as at 26 to a passageway 28 in the coupling element 22 leading down to another horizontally disposed passageway indicated generally at 30 and having an enlarged diameter section 30a which communicates with a smaller diameter section 30b. A shoulder between passageway sections 30a and 30b provides a valve seat 32 against which a valve assembly 34 is urged by a spring 36, the latter being axially contained by a retainer 38 bolted as at 40 to the coupling element 22. The smaller diameter section 30b of the passageway terminates in an opening 42 located in a flat perpendicular face 44 on the outboard side of the coupling element 22. Valve assembly 34 includes an integral nose 46 which is flush with the plane of surface 44 when the valve member is in the closed position as shown in the drawings. With the valve assembly 34 thus seated in the closed position against seat 32, any escape of fluid from housing conduit 24 through opening 42 is effectively prevented.

A stationary support structure generally indicated at 52 is provided on one side of the roll housing. Support structure 52 includes a plate 54 extending in a direction transverse to the housing guide rails 20. A pair of guide rails 56 is supported in a cantilever fashion from plate 54. The rails 56 which are arranged above and parallel to the housing bed surfaces 20, may be of any length sufficient to accommodate the extent of lateral traversal of the housing. A second movable coupling element 58 is mounted on the rails 56 by means of a pair of laterally extending rollers 60. This arrangement enables coupling elements 58 to move either with or independently of the housing 12 in the same transverse direction as the housing moves in relation to the mill pass line 16. Movement of coupling element 58 to the right as viewed in FIG. 1 is limited by resilient bumpers 62 carried by the transverse plate 54. The bumpers also serve as lateral alignment means for the coupling elements.

Figure 3:
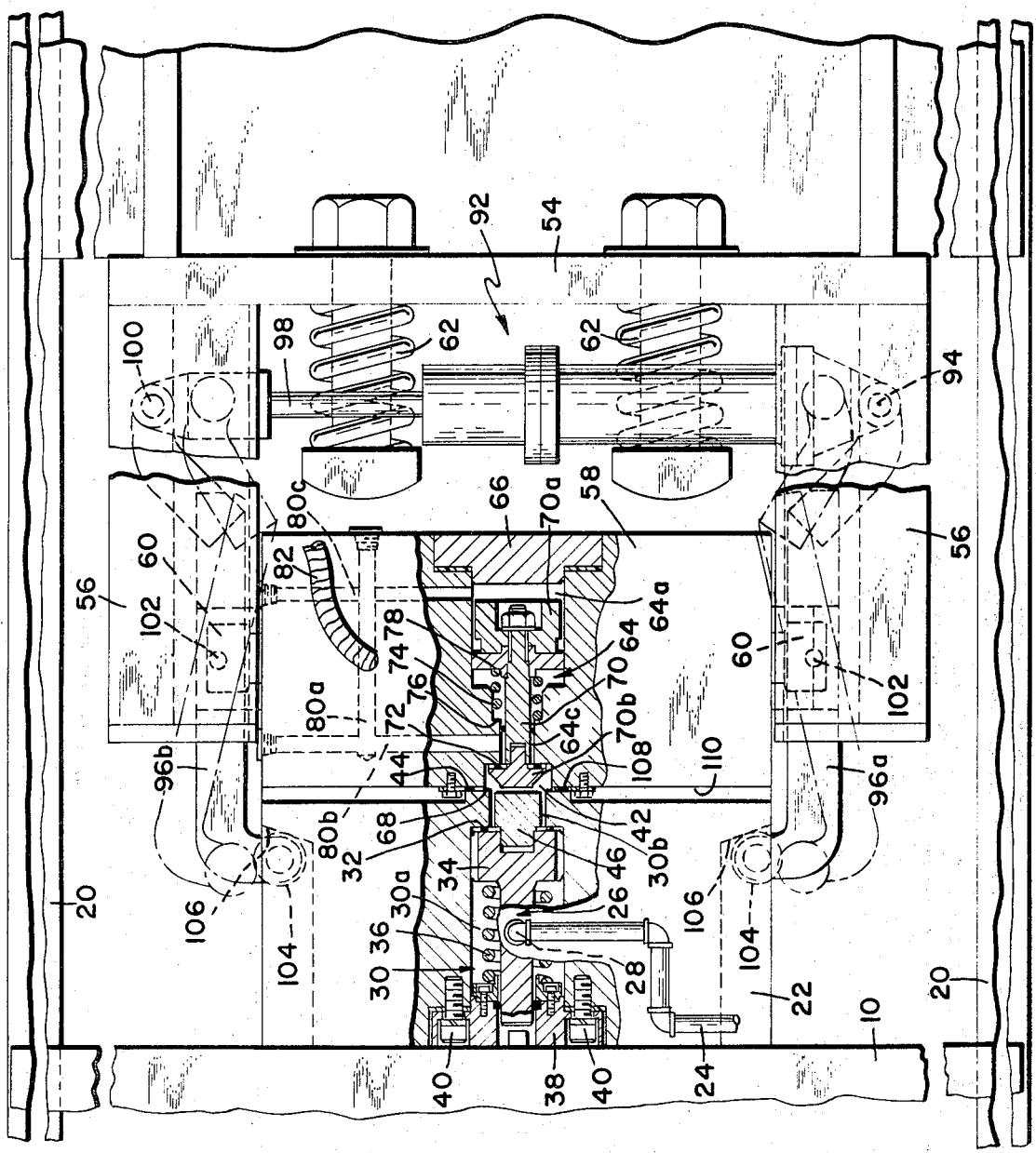
FIG. 3 is a plan view of an enlarged scale of the coupling arrangement shown in FIGS. 1 and 2 with portions of the abutting coupling elements broken away in order to better illustrate a typical arrangement of cooperating valve assemblies carried therein.

As is best shown in FIG. 3, the movable coupling element 58 is provided with a horizontally disposed passageway indicated generally at 64. Passageway 64 is plugged at one end as at 66 and terminates at the other end in an opening 68 facing the opening 42 in coupling element 22. A valve assembly 70 is axially movable within passageway 64. The valve assembly has a piston 10a at one end which is reciprocally contained within an enlarged diameter section 64a of the passageway 64. The other end of the valve assembly 70 includes a valve member 70b urged against a valve seat 72 by means of a spring 74, the latter having one end bearing against a shoulder 76 in passageway 64 and the other end bearing against piston 70a as at 78. As shown in FIG. 3, valve assembly 70 is in the closed position with valve member 70b seated against seat 72, thus preventing flow of fluid from passageway 64 out through opening 68.

The intermediate reduced diameter section 64c of passageway 64 is in communication via suitably arranged intermediate passageways 80a and 80b with a flexible conduit 82 leading through a control valve 84 (shown schematically in FIG. 2) to a source 86 of fluid under pressure, for example hydraulic fluid. Another suitable drilled passageway 80c connects intermediate passageway 80a to the enlarged diameter section 64a of passageway 64 at the rear of piston 70a.

When control valve 84 is closed, valve assemblies 34 and 70 are each closed as depicted in FIG. 3. When valve 84 is opened, fluid under pressure proceeds through flexible conduit 82 and intermediate passageways 80a and 80c into passageway section 64a at the rear of piston 70a. The pressure on piston 70a overcomes the closing force of spring 74 and causes valve assembly 70 to move axially to the left as viewed in FIG. 3. When this occurs, the valve member 70 contacts the nose 46 on valve member 34, with the result that the closing force of spring 36 is also overcome, thereby unseating valve member 34 from valve seat 32. Fluid then flows through intermediate conduits 80a and 80b and the passageways 64 and 30 into the housing conduit 24.

As an alternative to the above, passageway 80b might be connected directly to the fluid source 86 by one line, with a separate valved line being provided to feed passageway 80c. The valved line would supply "pilot" pressure which could be turned on and off without interferring with the supply of fluid to passageway 80b. By keeping the supply pressure to passageway 80b constant and uninterrupted, air entrapement is further minimized.

Clamping means are further provided for clamping the coupling elements 22 and 58 together in the operative position shown in the drawings. The clamping means includes a double acting piston and cylinder assembly 92, the cylinder being connected at one end as at 94 to a lever arm 96a, and the reciprocal piston rod 98 being connected at the other end as at 100 to another lever arm 96b. Both lever arms are pivotally attached as at 102 to the sides of the movable coupling elements 58. The forward ends of both lever arms 96a and 96b are provided with rollers 104 arranged to engage angularly disposed faces 106 on the sides of coupling element 22. When piston rod 98 is extended, the rollers 104 at the forward ends of lever arms 96a and 96b move inwardly against the angular faces 106, and this in turn causes coupling element 58 to be pulled and clamped to coupling element 22. When this occurs an annular sealing ring 108 surrounding opening 68 is squeezed between the flat surface 44 on coupling element 22 and the abutting surface 110 on coupling element 58, thereby providing a fluid-tight connection between passageways 64 and 30.

Figure 2:
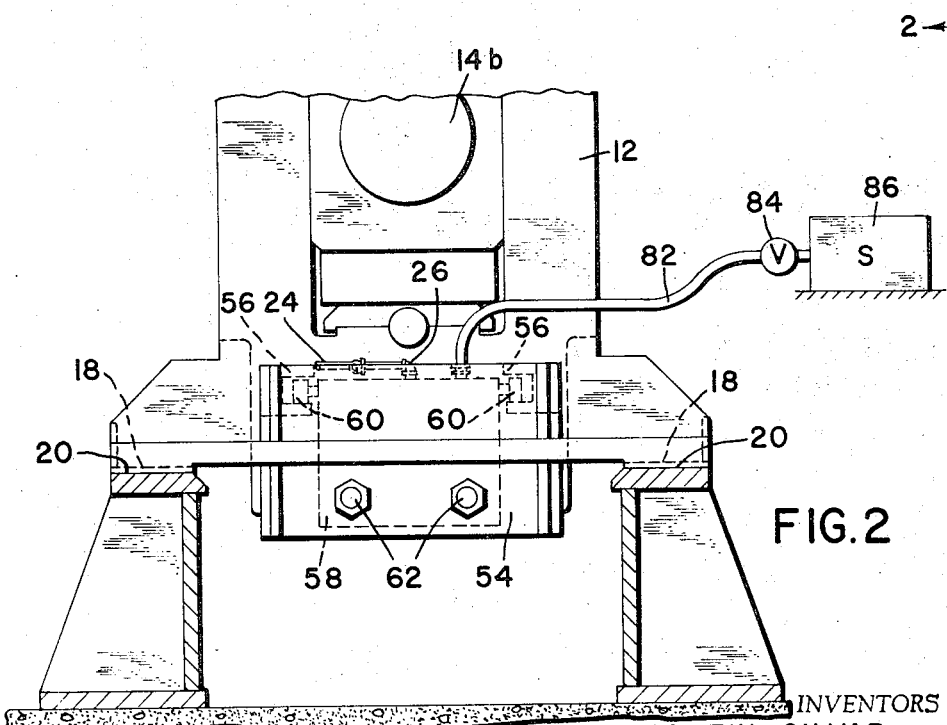
FIG. 2 is a sectional view taken along lines 2—2 of FIG. 1.

Having thus described the basic components of the embodiment disclosed in FIGS. 1–3, its operation and some of the advantages to be derived therefrom will now be reviewed. It will be understood that as depicted in the drawings, the coupling device is in the clamped position, with the valve assemblies 34 and 70 in the closed positions, thus precluding fluid flow into or out of housing conduit 24. As previously described, by simply opening control valve 84, fluid pressure from the source indicated schematically at 86 in FIG. 2 will cause the valve assemblies to be shifted to the open position. This condition will be maintained as long as the roll housing is in service, regardless of its position relative to the mill pass line. Any lateral shifting of the roll housing 12 along the housing bed surfaces 20 will be accompanied by a corresponding shift of the coupling element 58 along guide rails 56.

When it is desired to change roll housings, the first step in uncoupling the coupling device is to close control valve 84. This automatically shifts the valve assemblies 34 and 70 back to the closed positions shown in the drawings. Once this has been accomplished, the piston and cylinder assembly 92 is actuated to move the clamping arms 96a and 96b to the unclamped positions shown in dotted in FIG. 3. This frees the coupling element 58 for movement relative to its mating coupling element 22. The housing 12 may then be moved by any conventional means (not shown) away from the coupling element 58 along housing bed surfaces 20 and another fresh roll housing installed in its place. The fresh housing is then pushed towards coupling element until contact is made between the face 110 on coupling element 58 and the opposing face or faces 44 on another coupling element 22, the latter being attahced to the fresh housing. As the fresh housing is moved towards the right as shown in FIGS. 1 and 3, and the coupling element 58 is engaged, the latter element will also move to the right until its further movement in this direction is opposed by the resilient bumpers 62. At this point, the piston and cylinder assembly 92 will again be actuated to clamp the clamping arms 96a and 96b. The coupling element 58 will again be drawn against coupling element 22, thus compressing the sealing ring 108 to establish fluid-tight integrity between the two communicating passageways 64 and 30.

At this point it should be noted that as a housing 12 is being installed, some slight angular misalignment may be experienced between the opposed faces of the two coupling elements 22 and 58. However, due to the fact that coupling element 58 is suspended between two laterally disposed rollers 60, the latter being supported on inwardly disposed tracks 56, it will be understood that any such angular misalignment will be compensated for by a corresponding angular shift of the coupling element as it is clamped to the coupling element 22 by the pivotal action of the clamping arms 96a and 96b.

It is also important to note that the apparatus is capable of accommodating lateral misalignment of the coupling elements 22 and 58 during coupling. This is made possible in part by the difference in the diameters of openings 68 and 42, and partly because there are no male valve members extending across the interface between the abutting surfaces 44 and 110 when the valve assemblies are closed. The nose 46 of valve member 34 always remains flush or slightly behind the plane of face 44, and the actuating end of valve member 70 likewise remains behind the plane of the opposite surface 110 on coupling element 58. This condition persists until after the two coupling elements have been securely clamped together.

Once the coupling elements are again clamped together in their operative positions as shown in the drawings, the control valve 84 is opened and the apparatus is again ready to resume operation.

While the embodiment illustrated in FIGS. 1–3 incorporates only one set of communicating passageways 30 and 64 and associated valve assemblies, as previously indicated, it will be understood that in practice any additional number of communicating passageways and equivalent valve assemblies may be accommodated by the coupling elements. Moreover, although the abutting surfaces 44 and 110 are shown vertically disposed in order to better shed environmental contaminants such as dirt, mill scale, etc., the aforesaid surfaces may if desired be inclined at any angle.

Figure 4:
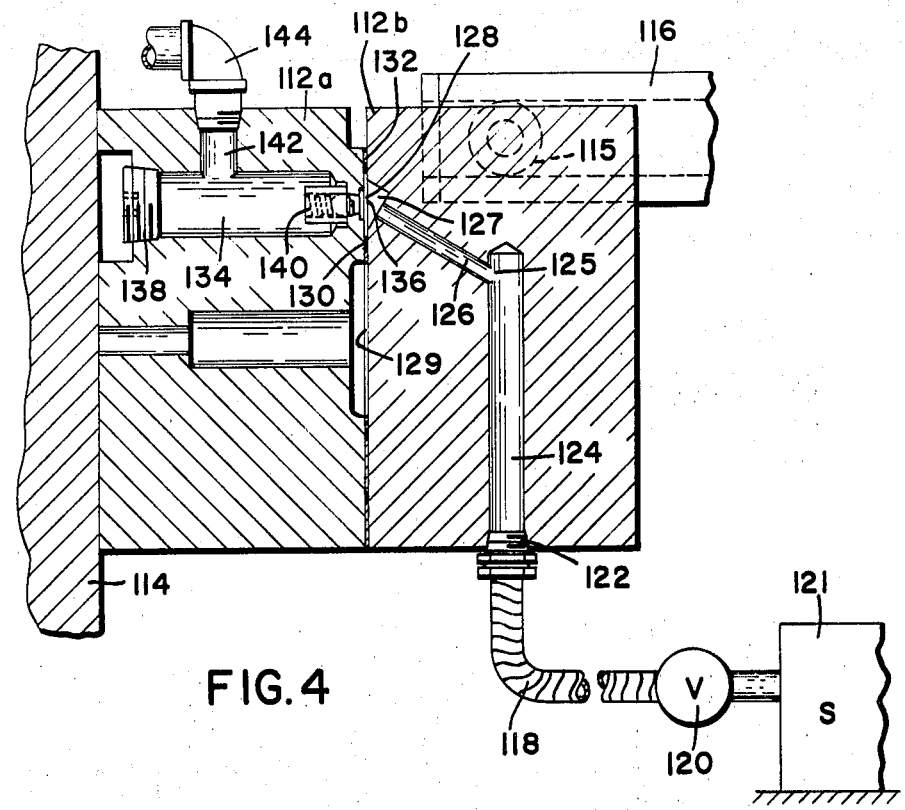
FIG. 4 is a vertical sectional view taken through a modified form of the invention.

Referring now to FIG. 4, there is shown another slightly modified form of the invention, again employing a set of coupling elements 112a and 112b, the former being attached to the main housing 114 and the latter being movably mounted by means of wheels 115 running along guide rails 116, much in the same manner as that provided with the movable coupling element 58 shown in FIGS. 1–3. It will be further understood that the coupling elements 112a and 112b may be clamped together by a clamping arrangement also like that shown in FIGS. 1–3.

This arrangement differs primarily from the arrangement previously described in that it does not employ cooperating valve assemblies in the communicating passageways extending through the respective coupling elements. More particularly, it wil be seen that a flexible feed line 118 having a valve 120 located therein, leads from a remote source 121 of fluid under pressure to the bottom end 122 of a passageway 124 extending vertically into the coupling element 112b. The upper end of passageway 124 communicates as at 125 with an upwardly inclined passageway 126, the other end of which terminates in an inclined cavity 127 which has an enlarged opening 128 on the face 129 of the coupling element. An annular seal 130 surrounds opening 128, and is compressed between surface 129 and an oppositely disposed flat surface 132 on the mating coupling element 112a.

Another passageway 134 is provided in coupling element 112a. Passageway 134 has an opening 136 at one end in surface 132, and another opening which is plugged as at 138. A standard spring loaded check valve 140 is screwed into the reduced diameter section of passageway 134 adjacent opening 136. A connecting passageway 142 leads vertically from passageway 134 to the housing conduit 144.

With the coupling elements 112a and 112b clamped together in the operative position shown in FIG. 4, valve 120 is opened to feed fluid from source 121. The fluid flows through flexible conduit 118, vertical passageway 124, inclined passageway 126 and then through the small inclined chamber 127 and the communicating openings 128 and 136. The fluid pressure is sufficient to open the spring loaded check valve 140, and thus the fluid continues through passageways 134 and 142 into the housing conduit 144. Fluid tight integrity between the coupling elements is again provided by the sealing ring 130 which is compressed slightly between the oppositely disposed vertical flat surfaces 129 and 132. The diameter of opening 128 is again made larger than that of opening 136 to accommodate any lateral misalignment experienced between the two coupling elements.

When the coupling elements are uncoupled, valve 120 is first closed. Thereafter, as the coupling elements are parted, any leakage of fluid from passageway 134 is prevented by the check valve 140. Some minor leakage from coupling element 112b is experienced from the inclined cavity 127 and the upper end of passageway 126, but such leakage is minor in nature and for many applications, is not considered particularly detrimental.

It is our intention to cover all changes and modifications of the embodiment herein disclosed which do not constitute departures from the spirit and scope of the invention as claimed.

We claim:

1. A housing which carries at least one first fluid conduit, and which is movable in opposite directions along a path, a coupling device for connecting the first fluid conduit to a flexible second fluid conduit which is separate from the housing, said coupling device comprising: a first coupling element attached to and movable with the housing, said first coupling element having a first sealing face with a first opening therein, a first passageway extending through said first coupling element, said first passageway providing a connection between said first opening and the first fluid conduit carried by the housing, stationary support means including guide rails at one end of the path travelled by the housing, a second coupling element mounted on said guide rails for movement therealong in opposite directions parallel to the path travelled by the housing, said second coupling element having a second sealing face with a second opening therein, said second opening being in general alignment with said first opening a second passageway extending through said second coupling element, said second passageway providing a connection between said second opening and the flexible second conduit which is separate from the housing, and clamping means for clamping said first and second coupling elements together with said first and second sealing faces in sealing engagement and with said first and second openings in general alignment, thereby establishing a communicating relationship between said first and second passageways and the first and second conduits connected thereto.

2. The apparatus as claimed in claim 1 wherein said first and second sealing faces are located in vertical oppositely disposed parallel planes.

3. The apparatus as claimed in claim 1 wherein said guide rails are parallel and cantilevered, said second coupling element having laterally protruding guide wheels arranged to run along said guide rails.

4. The apparatus as claimed in claim 1 wherein said stationary support means includes resilient bumper means for limiting movement of said second coupling element away from the housing.

5. The apparatus as claimed in claim 1 wherein said clamping means includes a pair of clamping arms pivotally mounted on one of said coupling elements, said clamping arms having rollers on the ends thereof, which rollers cooperated with inclined faces on the other coupling element to clamp the coupling elements together.

6. The apparatus as claimed in claim 5 wherein said clamping arms are pivotally manipulated by means of a fluid-actuated piston-cylinder assembly which is pivotally connected to both of said pivotal arms.

7. A housing carrying at least one first fluid conduit, the said housing being movable in opposite directions along a given path, a coupling device for connecting the first fluid conduit to a flexible second fluid conduit which is separate from the housing, said coupling device comprising in combination: a first coupling element attached to and movable with the housing, said first coupling element having a first vertically disposed face with a first opening therein; a first passageway extending through said first coupling element, said first passageway providing a fluid connection between said first opening and the first fluid conduit carried by the housing; stationary support means at one end of the path travelled by said housing, said stationary support means including a pair of cantilevered guide rails extending in a direction parallel to the path travelled by the housing; a second coupling element carried by said stationary support means, said second coupling element having laterally disposed guide wheels arranged to run along said guide rails, thereby permitting movement of said second coupling element on said stationary support means in opposite directions parallel to the direction of movement of the housing, said second coupling element being further provided with a second vertically disposed face which is both oppositely disposed and parallel to said first face on said first coupling element, said second face having a second opening therein; said second opening being in general alignment with said first opening, a second passageway extending through said second coupling element, said second passageway providing a fluid connection between said second opening and the flexible second conduit which is separate from the housing; and clamping means for clamping said first and second coupling elements together with said first and second faces in sealing engagement and with said first and second openings in communicating relationship, said clamping means including a pair of clamping arms pivotally mounted on said second coupling element, each of said clamping arms having a roller at one end thereof which cooperates with an inclined surface on the first coupling element to clamp the coupling elements together, the other ends of said clamping arms being pivotally connected to a piston-cylinder assembly which operates to pivotally manipulate said clamping arms.

* * * * *